United States Patent
Sakamoto

(10) Patent No.: US 9,558,410 B2
(45) Date of Patent: Jan. 31, 2017

(54) ROAD ENVIRONMENT RECOGNIZING APPARATUS

(71) Applicant: HONDA MOTOR CO., LTD., Tokyo (JP)

(72) Inventor: Yosuke Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/689,384

(22) Filed: Apr. 17, 2015

(65) Prior Publication Data

US 2015/0310284 A1 Oct. 29, 2015

(30) Foreign Application Priority Data

Apr. 24, 2014 (JP) .................. 2014-090733

(51) Int. Cl.
| | |
|---|---|
| *G06K 9/46* | (2006.01) |
| *G06K 9/00* | (2006.01) |
| *G06T 7/00* | (2006.01) |
| *B62D 15/02* | (2006.01) |

(52) U.S. Cl.
CPC ......... *G06K 9/00805* (2013.01); *B62D 15/025* (2013.01); *B62D 15/0265* (2013.01); *G06K 9/00798* (2013.01); *G06K 9/4604* (2013.01); *G06T 7/0085* (2013.01); *G06T 2207/10016* (2013.01); *G06T 2207/10024* (2013.01);
(Continued)

(58) Field of Classification Search
CPC .............. G06K 9/00798; G06K 9/4652; G06K 9/00805; G06K 9/00818; G06T 2207/30256; G06T 2207/30261; G06T 2207/10016; G06T 7/0085; G06T 7/0083; G06T 7/0097; B62D 15/025; B62D 15/0265; G08G 1/165; G08G 1/167
USPC ..... 701/41, 28; 382/199, 103, 104, 165, 167
See application file for complete search history.

(56) References Cited

U.S. PATENT DOCUMENTS

| 8,306,263 | B2 * | 11/2012 | Nagaoka | ............ G06K 9/00805 |
| | | | | 382/103 |
| 8,385,601 | B2 * | 2/2013 | Kawasaki | ................ G06K 9/00 |
| | | | | 348/148 |

(Continued)

FOREIGN PATENT DOCUMENTS

| JP | 5152002 B2 | 2/2013 |
| JP | 5195377 B2 | 5/2013 |

*Primary Examiner* — Dalena Tran
(74) *Attorney, Agent, or Firm* — Westerman, Hattori, Daniels & Adrian, LLP

(57) ABSTRACT

A road environment recognizing apparatus includes an edge image generator, a first area extractor, and an object recognizer. The edge image generating unit generates an edge image by extracting edge points from an image of a road captured by a camera. The edge points have amounts of change in luminance from surroundings, which are higher than or equal to a predetermined value. The first area extractor extracts a first area from the edge image. The first area is partitioned by the edge points and has a luminance higher than the luminances of the surroundings. If a second area having a luminance lower than the luminances of the surroundings exists around the first area in the edge image, the object recognizer recognizes a projection on the road on the basis of a third area resulting from joining of the first area and the second area.

10 Claims, 6 Drawing Sheets

(52) U.S. Cl.
CPC ............... *G06T 2207/30256* (2013.01); *G06T 2207/30261* (2013.01)

(56) References Cited

U.S. PATENT DOCUMENTS

| | | | |
|---|---|---|---|
| 8,699,754 B2 * | 4/2014 | Zhang | G06K 9/00798 348/116 |
| 2003/0103650 A1 * | 6/2003 | Otsuka | G06K 9/00798 382/104 |
| 2015/0195496 A1 * | 7/2015 | Hayakawa | B60R 1/00 348/118 |

* cited by examiner

ROAD ENVIRONMENT RECOGNIZING APPARATUS

CROSS REFERENCES TO RELATED APPLICATIONS

The present application claims priority under 35 U.S.C. §119 to Japanese Patent Application No. 2014-090733, filed Apr. 24, 2014, entitled "Road Environment Recognizing Apparatus." The contents of this application are incorporated herein by reference in their entirety.

BACKGROUND

1. Field

The present disclosure relates to a road environment recognizing apparatus that recognizes a projection around a road on the basis of an image captured by a camera mounted in a vehicle.

2. Description of the Related Art

Road environment recognizing apparatuses have been hitherto known, which recognize projections around roads from images of the roads in front of vehicles, which are captured by in-vehicle cameras (for example, refer to Japanese Patent Application No. 5195377 and Japanese Patent Application No. 5152002).

Japanese Patent Application No. 5195377 describes a traffic lane boundary detecting apparatus that recognizes road studs for each pixel group of pixels on one horizontal line in an image of a travelling road, which is captured by an image capturing unit, on the basis of the continuous pixels on the one horizontal line, which have luminances higher than or equal to a predetermined threshold value.

Japanese Patent Application No. 5152002 describes a traffic lane recognizing apparatus that, after converting pixels having edge strengths higher than or equal to a threshold value into white and converting pixels having edge strengths lower than the threshold value into black in an edge image of a captured image, recognizes road studs on the basis of the white areas that have areas higher than or equal to a predetermined value and that have aspect ratios higher than or equal to a predetermined value, among the white areas resulting from omnidirectional expansion using, for example, morphological operations.

However, with the technologies in the related art, the projections may not be detected due to the effect of shades caused by sunlight or the like despite the fact that the projections exist around the road and there is room for further improvement in terms of increase in recognition accuracy of the projections around the road.

For example, in the technology disclosed in Japanese Patent Application No. 5195377, since the number of the pixels having the luminances higher than or equal to the predetermined threshold value is reduced when part of the road studs is shaded due to the sunlight or the like, it may not be possible to extract the continuous pixels on the one horizontal line, which have the luminances higher than or equal to the predetermined threshold value. As a result, the road studs may be not recognized despite the fact that the road studs exist.

In contrast, in the technology disclosed in Japanese Patent Application No. 5152002, the size of the expanded white areas is made smaller than the predetermined value when part of the road studs is shaded due to the sunlight or the like. As a result, the road studs may be not recognized even if the road studs exit in a portion corresponding to the white areas.

SUMMARY

It is desirable to provide a road environment recognizing apparatus capable of increasing the accuracy in recognition of projections in the recognition of the projections around a road.

The present application describes a road environment recognizing apparatus, a vehicle, and a road environment recognizing method, which recognize the projections around the road on the basis of an image around the vehicle, which is captured by a camera.

A road environment recognizing apparatus according to an embodiment of the present disclosure includes an edge image generator that generates an edge image by extracting edge points from an image of a road captured by a camera, the edge points having amounts of change in luminance (the term "luminance" may also be referred to as a luminance intensity or level) from surroundings, which are higher than or equal to a predetermined value; a first area extractor that extracts a first area from the edge image, the first area being partitioned by the edge points and having a luminance higher than the luminances of the surroundings; a second area extractor that extracts a second image having a luminance lower than the luminances of the surroundings and existing around the first area in the edge image; and an object recognizer that recognizes a projection on the road on the basis of a third area resulting from joining of the first area and the second area. In one embodiment, the first extractor and/or the object recognizer may perform the function of the second area extractor. The first and second area extractors may collectively be referred to as an image extractor.

The inventor found that the image portion of a place irradiated with light (for example, sunlight) of a projection existing on a road has a luminance higher than the luminance of the surrounding road and the image portion of a shaded place of the projection has a luminance lower than the luminance of the surrounding road.

In the road environment recognizing apparatus having the configuration focusing on the above point, the projection on the road is recognized on the basis of the third area resulting from joining of the first area having a luminance higher than the luminances of the surroundings and the second area around the first area, which has a luminance lower than the luminances of the surroundings. Accordingly, the projection is recognized on the basis of the third area resulting from joining of the first area corresponding to the image portion of the place that is not shaded and the second area corresponding to the image portion of the place that is shaded even if part of the projection is covered with the shade of the projection. As a result, the probability of false recognition is reduced, in which it is estimated that the projection does not exist because part of the projection is covered with the shade despite the fact that the projection exists.

Consequently, with the road environment recognizing apparatus having the above configuration, it is possible to increase the accuracy in recognition of the projection in the recognition of the projection around the road.

In the road environment recognizing apparatus, the first area extractor preferably extracts an area that is surrounded by the edge points for partition as the first area.

With the road environment recognizing apparatus having the above configuration, the area that is surrounded by the edge points for partition is extracted as the first area. The probability that the area surrounded by the edge points is a three-dimensional object is high. Accordingly, it is possible to increase the accuracy in recognition of the projection in the recognition of the projection around the road in the road environment recognizing apparatus having the above configuration.

In the road environment recognizing apparatus, if the hue of the first area is a certain first color indicating a road stud and the size of the first area is within a first range defined by the size of the road stud on a real space, the object recognizer preferably recognizes the first area as an image portion of the road stud, which is the projection.

With the road environment recognizing apparatus having the above configuration, since the first area is recognized as the image portion of the road stud when the size of the first area having the first color is within the first range corresponding to the size of the road stud, it is possible to recognize the road stud with high accuracy.

In the road environment recognizing apparatus, the object recognizer preferably searches for an area that exists around the first area and that has a hue being a second color darker than the first color as the second area if the size of the first area is smaller than a lower limit of the first range (a threshold size in area and/or dimension predetermined based on an actual size of a road stud). When the second area is searched for, the object recognizer preferably recognizes the third area as the image portion of the road stud if the size of the third area is within a second range (a threshold size defined in area and/or dimension predetermined for this search) defined by the size of the road stud.

Although the size of the first area corresponding to the portion irradiated with the light source, such as the sunlight, of the road stud may be varied depending on the direction of the light source, the size of the third area resulting from joining of the portion of the road stud and the second area corresponding to the shaded portion of the road stud depend on the size of the road stud. Accordingly, it is estimated that the degree of change in the size of the third area is small.

Consequently, when the size of the third area is within a certain range defined by the size of the road stud, the probability of the third area being the image portion of the road stud is high.

With the road environment recognizing apparatus configured from this viewpoint, it is possible to increase the accuracy in recognition of the road stud in the recognition of the road stud around the road.

In the road environment recognizing apparatus, the object recognizer preferably recognizes a road stud as the projection. The road environment recognizing apparatus preferably further includes a traffic lane recognizer that recognizes a traffic lane on the basis of the recognized road stud; and a steering controller that performs steering control of a vehicle on the basis of the recognized traffic lane.

With the road environment recognizing apparatus having the above configuration, it is possible to control the vehicle on the basis of the traffic lane using the road studs as the boundary on the road on which the road studs are provided.

In the road environment recognizing apparatus, the object recognizer preferably recognizes the road stud in distinction from the projection on the road, which is different from the road stud. The steering controller preferably performs the steering control when the road stud is recognized in a manner different from a manner when the projection on the road, which is different from the road stud, is recognized.

With the road environment recognizing apparatus having the above configuration, since the vehicle is controlled such that the road stud is distinguished from the projection on the road, which is different from the road stud, it is possible to control the vehicle in accordance with the actual road environment.

In the road environment recognizing apparatus, the object recognizer preferably determines whether the projection is an obstacle on the basis of a height of the projection. The steering controller preferably performs avoidance control of the projection when the projection is recognized as the obstacle and does not perform the avoidance control of the projection when the projection is not recognized as the obstacle.

With the road environment recognizing apparatus having the above configuration, the avoidance control is performed when the projection is recognized as an obstacle while the avoidance control is not performed when the projection is not recognized as an obstacle. Accordingly, it is possible to stably control the vehicle, compared with a case in which the avoidance control is performed for all the projections.

In the road environment recognizing apparatus, the object recognizer preferably searches for the second area in an area around the first area, in which a shaded image portion of the projection, estimated on the basis of the direction of the sunlight, is likely to exist.

With the road environment recognizing apparatus having the above configuration, since the second area is searched for in the area around the first area, in which the shaded image portion of the projection estimated on the basis of the direction of the sunlight are likely to exist, it is possible to reduce the calculation cost.

A vehicle according to an embodiment of the present disclosure includes an edge image generator that generates an edge image by extracting edge points from an image of a road captured by a camera, the edge points having amounts of change in luminance from surroundings, which are higher than or equal to a predetermined value; a first area extractor that extracts a first area from the edge image, the first area being partitioned by the edge points and having a luminance higher than the luminances of the surroundings; and an object recognizer that, if a second area having a luminance lower than the luminances of the surroundings exists around the first area in the edge image, recognizes a projection on the road on the basis of a third area resulting from joining of the first area and the second area.

A road environment recognizing method according to an embodiment of the present disclosure includes generating an edge image by extracting edge points from an image of a road captured by a camera, the edge points having amounts of change in luminance from surroundings, which are higher than or equal to a predetermined value; extracting a first area from the edge image, the first area being partitioned by the edge points and having a luminance higher than the luminances of the surroundings; and recognizing, if a second area having a luminance lower than the luminances of the surroundings exists around the first area in the edge image, a projection on the road on the basis of a third area resulting from joining of the first area and the second area.

BRIEF DESCRIPTION OF THE DRAWINGS

FIG. 3A illustrates a captured image, FIG. 3B illustrates edge images subjected to edge processing, and FIG. 3C illustrates first areas after an edge direction is calculated.

FIG. 4A illustrates a captured image, FIG. 4B illustrates edge images subjected to the edge processing, and FIG. 4C illustrates first areas and second areas after the edge direction is calculated.

DESCRIPTION OF THE PREFERRED EMBODIMENTS (Configuration of Road Environment Recognizing Apparatus)

Embodiments of a road environment recognizing apparatus of the present disclosure will herein be described with reference to FIG. 1 to FIG. 5.

Figure 1:
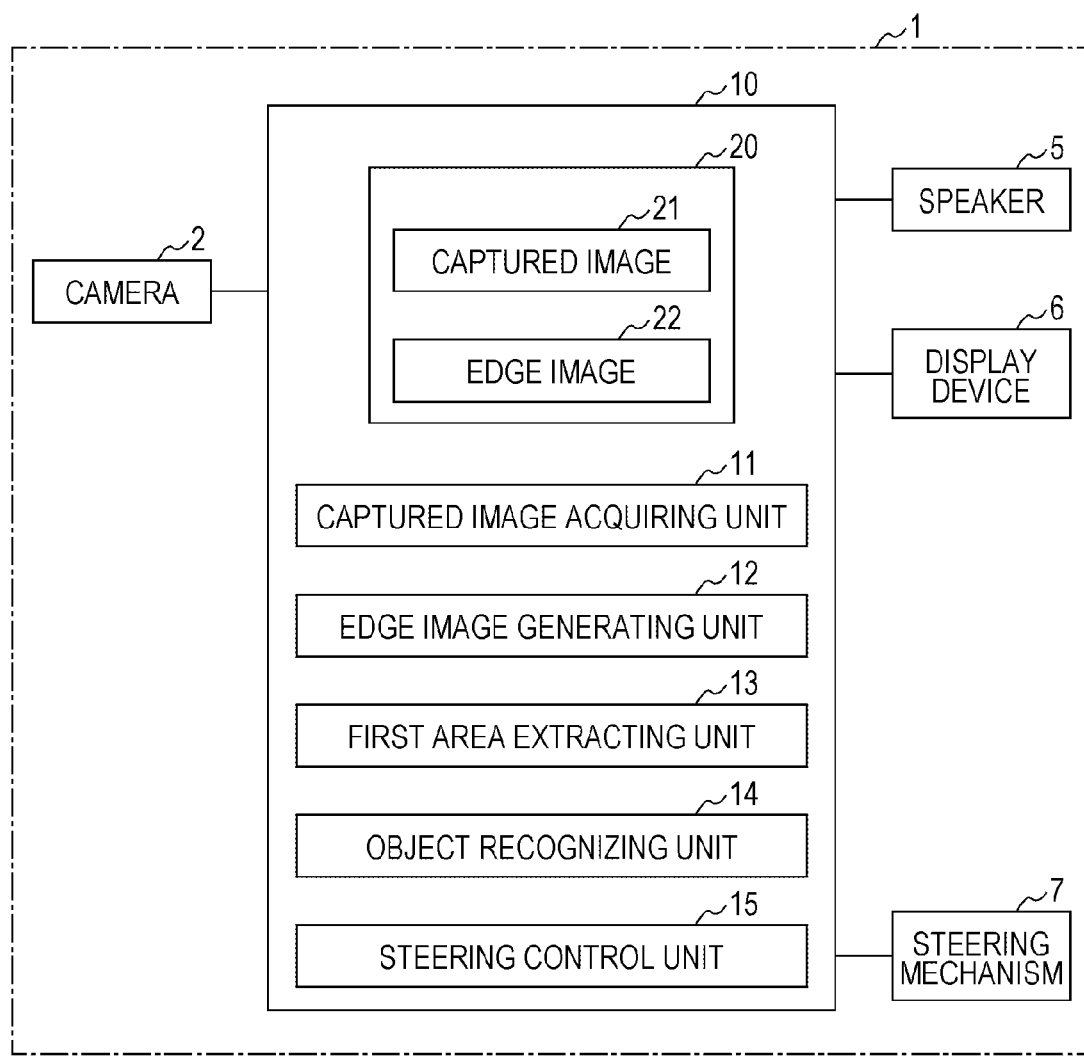
FIG. 1 is a block diagram illustrating an exemplary configuration of a road environment recognizing apparatus according to an embodiment.

FIG. 1 is a block diagram illustrating an exemplary configuration of a road environment recognizing apparatus 10 according to an embodiment. Referring to FIG. 1, the road environment recognizing apparatus 10 is mounted in a vehicle 1 (corresponding to a vehicle of the present disclosure) including a camera 2 (a color camera), a speaker 5, a display device 6, and a steering mechanism 7.

The road environment recognizing apparatus 10 is an electronic unit composed of a central processing unit (CPU), a memory, various interface circuits, and so on, which are not illustrated in FIG. 1. The CPU executes a Botts' dots recognition program and a steering control program, which are stored in the memory, to cause the road environment recognizing apparatus 10 to function as a captured image acquiring unit 11, an edge image generating unit 12 (an edge image generator), a first area extracting unit 13 (a first area extractor), an object recognizing unit 14 (an object recognizer), and a steering control unit 15. A road environment recognizing method according to an embodiment is performed by the road environment recognizing apparatus 10.

(Road Environment Recognizing Process)

A process of recognizing Botts' dots (road studs) provided on a road, which is performed by the road environment recognizing apparatus 10, will now be described with reference to flowcharts illustrated in FIG. 2A and FIG. 2B. The road environment recognizing apparatus 10 performs the process illustrated in the flowcharts in FIG. 2A and FIG. 2B on a certain control cycle to recognize the Botts' dots on the road on which the vehicle 1 is travelling.

Figure 2A:
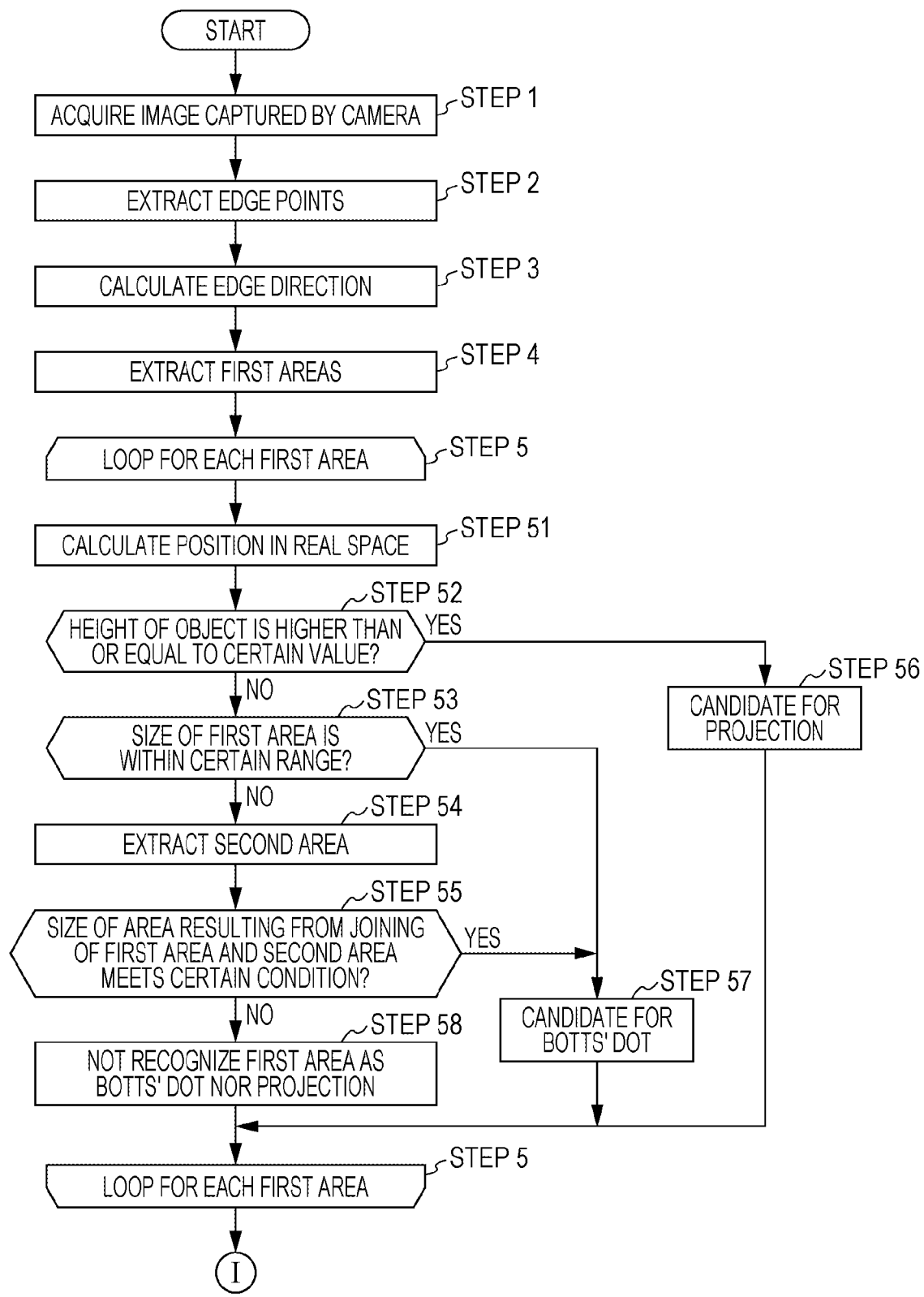
FIG. 2A is a flowchart illustrating a process of recognizing Botts' dots.

Referring to FIG. 2A, in STEP1, the captured image acquiring unit 11 receives a video signal in front of the vehicle 1 (corresponding to "around the vehicle" of the present disclosure), which is supplied from the camera 2, performs demosaicing of color components (an R value, a G value, and a B value) of the video signal, and acquires a captured image 21 of a color having the R value, the G value, and the B value as data about each pixel. The captured image acquiring unit 11 stores the data on the captured image 21 in a memory 20.

STEP2 and STEP3 are performed by the edge image generating unit 12. The processing performed by the edge image generating unit 12 corresponds to an edge image generating step in the road environment recognizing method of the present disclosure.

The edge image generating unit 12 converts the color components of each pixel in the captured image 21 into a luminance to generate a grayscale image (multi-valued image). In STEP2, the edge image generating unit 12 generates an edge image 22 (refer to FIG. 1) by extracting edge points from the grayscale image. The edge points are pixels having the difference in luminance (the amount of change in luminance) from surrounding pixels (image portions), which is higher than or equal to a predetermined value. The edge points include positive edge points the luminances of which are varied in ascending order and negative edge points the luminances of which are varied in descending order.

Since the grayscale captured image is acquired from the luminance of each pixel when the camera 2 is a monochrome camera, it is not necessary to perform the step of generating the grayscale image from the color captured image.

Figure 3A:
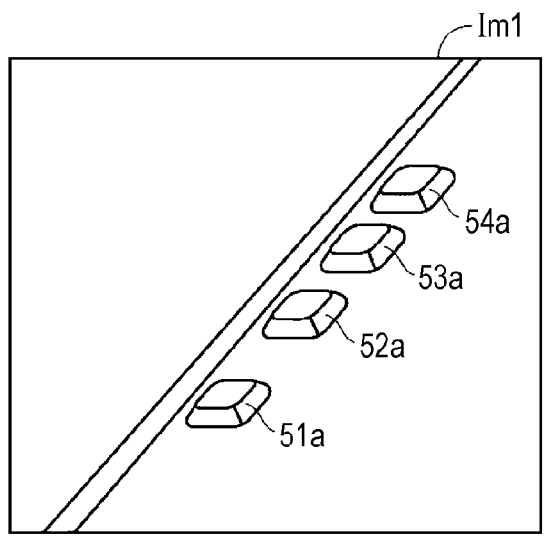
FIGS. 3A to 3C are diagrams when shaded portions of the Botts' dots are relatively small.

Im1 illustrated in FIG. 3A is an exemplary grayscale image generated from the captured image 21. The grayscale image Im1 includes image portions 51a to 54a of Botts' dots which define a border partitioning a traffic lane on which the vehicle 1 (the own vehicle) is travelling.

Figure 3B:
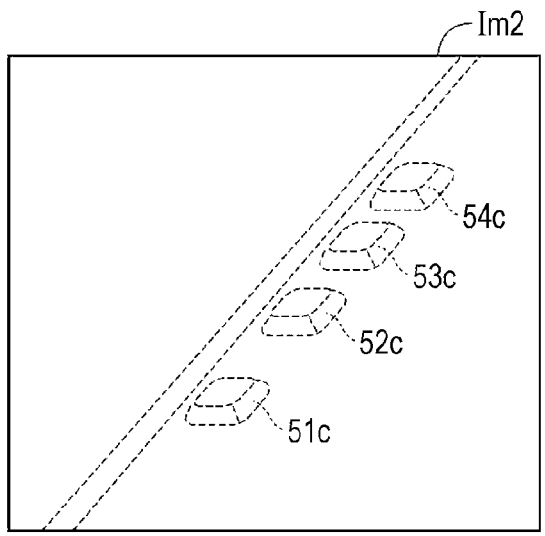

Im2 illustrated in FIG. 3B is an edge image generated by performing edge extraction to the grayscale image Im1. In image portions 51c to 54c of the Botts' dots in the edge image Im2, the image portions corresponding to places irradiated with the sunlight are surrounded by the edge points.

Figure 4A:
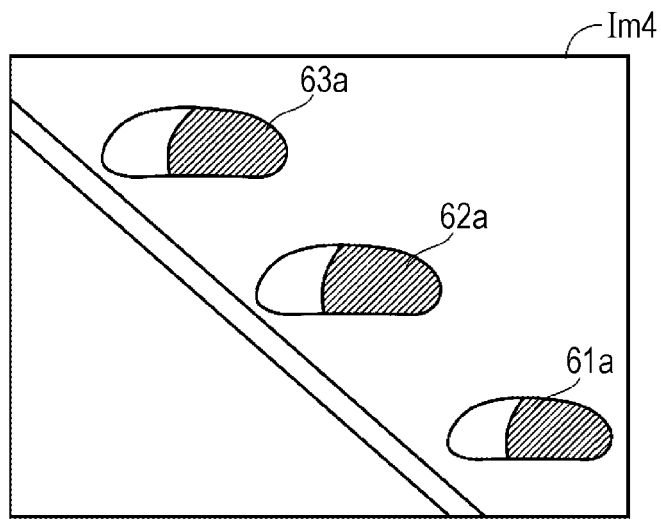
FIGS. 4A to 4C are diagrams when shaded portions of the Botts' dots are relatively large.

Im4 illustrated in FIG. 4A is an exemplary grayscale image generated from the captured image 21. The grayscale image Im4 includes image portions 61a to 63a of Botts' dots, which are partially shaded.

Figure 4B:
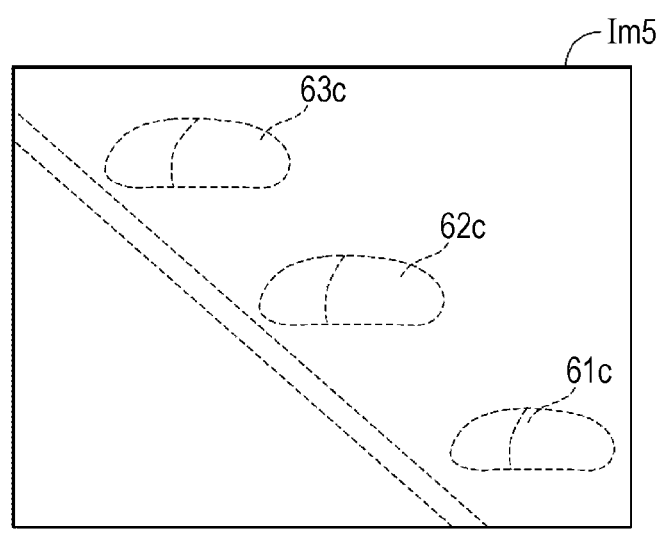

Im5 illustrated in FIG. 4B is an edge image generated by performing the edge extraction to the grayscale image Im4. In image portions 61c to 63c of the Botts' dots in the edge image Im5, the image portions corresponding to places irradiated with the sunlight and the shaded image portions are surrounded by the edge points.

In STEP3, the edge image generating unit 12 detects edge lines by calculating an edge direction, which is a direction in which the luminance is varied, from the captured image 21 for each edge point. The edge direction is a direction in which the density of the luminance is varied. Grouping the edge points having the same edge direction allows the edge lines partitioning portions having different luminances to be detected. The edge lines compose one partition line partitioning one area having a certain luminance.

Figure 3C:
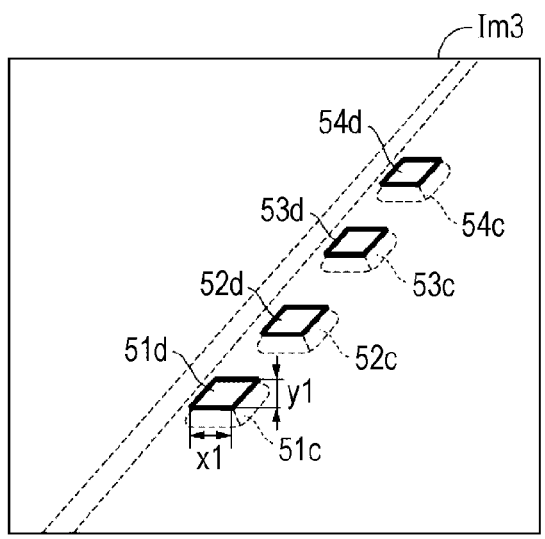

As the result of STEP3, as illustrated by Im3 in FIG. 3C, image portions (areas 51d to 54d) corresponding to the portions of the Botts' dots, which are irradiated with the sunlight, are partitioned by multiple edge lines. As illustrated by Im6 in FIG. 4C, image portions (areas 61d to 63d) corresponding to the portions of the Botts' dots, which are irradiated with the sunlight, are partitioned by multiple edge lines and shaded image portions (areas 61e to 63e) are partitioned by multiple edge lines.

In STEP4, the first area extracting unit 13 extracts first areas 51d to 54d and 61d to 63d each having a luminance (for example, an average of the luminances in each area or a maximum value of the luminances of the pixels in each area) higher than or equal to a predetermined first luminance, among the areas 51d to 54, 61d to 63d, and 61e to 63e partitioned by the multiple edge lines. The predetermined first luminance is defined from the viewpoint in which each area has a luminance higher than the luminances of the surroundings (the road). For example, the average luminance in an area of a certain size including the corresponding area is used as the predetermined first luminance.

The processing performed by the first area extracting unit 13 corresponds to a first area extracting step in the road environment recognizing method of the present disclosure.

Figure 2B:
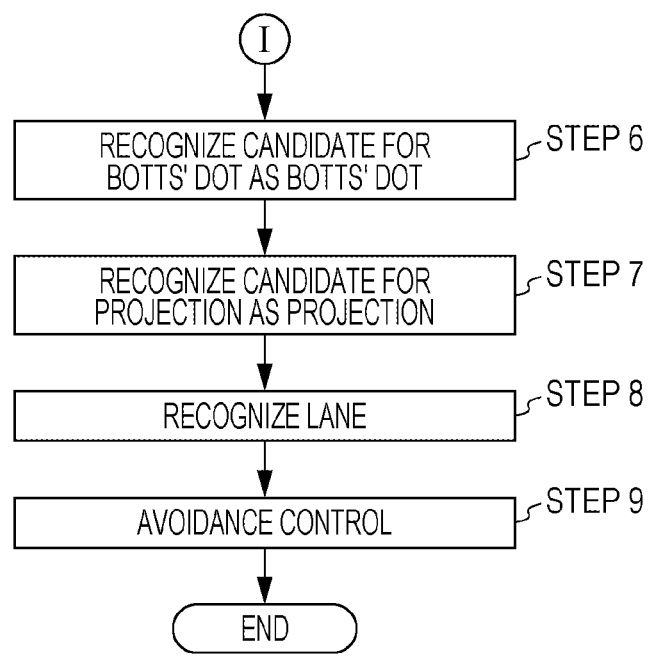
FIG. 2B is a flowchart illustrating the process of recognizing Botts' dots.

STEP5 in FIG. 2A (STEP 51 to STEP 58 in FIG. 2A) and STEP6 to STEP8 in FIG. 2B are performed by the object recognizing unit 14. The processing performed by the object recognizing unit 14 corresponds to an object recognizing step in the road environment recognizing method of the present disclosure.

The object recognizing unit 14 performs STEP51 to STEP58 in FIG. 2A (STEP5 in FIG. 2A) for each of the first areas 51d to 54 and 61d to 63d extracted by the first area extracting unit 13. The first area for which STEP51 to STEP58 in FIG. 2A are to be performed is referred to as the "current first area."

In STEP51, the object recognizing unit 14 performs inverse projection transformation from a camera coordinate to a real space coordinate for the current first area to calculate the position of a projection in the real space, which corresponds to the current first area.

In STEP52, the object recognizing unit 14 determines whether the height of the projection in the real space, which corresponds to the current first area and which is estimated on the basis of the calculated position, is higher than or equal to a predetermined value. If the determination is affirmative (YES in STEP52), in STEP56, the object recognizing unit 14 recognizes the current first area as a candidate for the image portion of the projection.

If the determination is negative (NO in STEP52), in STEP53, the object recognizing unit 14 determines whether the size of the current first area is within a certain range. The certain range is set in consideration of the size of the image portion of a Botts' dot when the Botts' dot exists at the position in the real space corresponding to the current first area. In addition to the size of the image portion of the Botts' dot, it may be determined whether the hue of the first area is a certain hue (the hue defined from the color of the surface of the Botts' dot: for example, white).

For example, as illustrated by Im3 in FIG. 3C, the object recognizing unit 14 determines whether the size of the first area 51d defined by a horizontal width x1 and a vertical width y1 is within the size of the image portion of the Botts' dot estimated from the position in the real space corresponding to the first area 51d. Since the image portion 51a of the Botts' dot illustrated in FIG. 3A is hardly shaded, the size of the first area 51d corresponding to the image portion 51a of the Botts' dot is within the size of the image portion of the Botts' dot estimated from the distance in the real space.

Figure 4C:
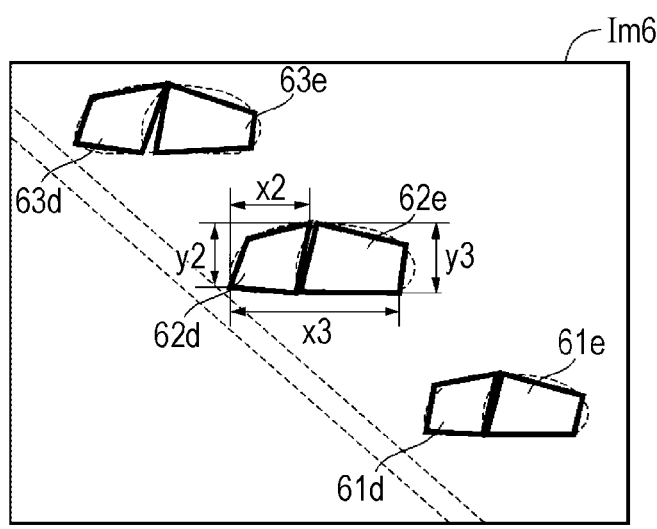

As illustrated by Im6 in FIG. 4C, the object recognizing unit 14 determines whether the size of the first area 62d defined by a horizontal width x2 and a vertical width y2 is higher than or equal to a predetermined value estimated from the position in the real space corresponding to the first area 62d. Since the image portion 62a of the Botts' dot illustrated in FIG. 4A is partially shaded, the size of the first area 62d corresponding to a portion irradiated with the sunlight in the image portion 62a of the Botts' dot is outside the size of the image portion of the Botts' dot estimated from the distance in the real space.

If the determination is affirmative (YES in STEP53), in STEP57, the object recognizing unit 14 recognizes the current first area as a candidate for the image portion of the Botts' dot.

If the determination is negative (NO in STEP53), in STEP54, the object recognizing unit 14 searches for a second area around the current first area, which has a luminance lower than a predetermined second luminance.

The area where the second area is searched for is an area in which the area defined by the size of the Botts' dot is overlapped with the shaded area estimated from the direction of the sunlight. The predetermined second luminance is lower than the luminances of the surroundings (for example, the road) of the second area. For example, the average luminance of an area including the second area may be used as the predetermined second luminance. The first luminance may be equal to the second luminance. If the size of the current first area exceeds an upper limit of the certain range, the process may skip STEP54 to STEP57 in FIG. 2A and may go to STEP58 in FIG. 2A.

An area that is horizontally shifted from the first area 62d by the difference in horizontal width (x-x2) and that is vertically shifted from the first area 62d by the difference in vertical width (y-y2) may be adopted as the area defined from the size of the Botts' dot, for example, on the basis of a certain horizontal width x and a certain vertical width y of the Botts' dot and the horizontal width x2 and the vertical width y2 of the first area 62d.

The direction of the sunlight can be estimated on the basis of the direction in which the camera 2 captures an image and the date and time. The direction in which the camera 2 captures an image is estimated from, for example, the travelling direction of the vehicle 1 and the angle of inclination of the camera 2. The area shaded by the sunlight can be estimated using various known technologies.

When the hue of the first area is different from an estimated hue, the process goes to STEP58 without the search for the second area by the object recognizing unit 14.

In STEP55, the object recognizing unit 14 determines whether the size of a third area resulting from joining of the current first area and the second area is within a certain range. The certain range is the range of the size of the image portion of the Botts' dot, which is estimated from the position in the real space corresponding to the third area. If the second area is not extracted, the process goes to STEP58 without the determination in STEP55.

For example, as illustrated in FIG. 4C, the object recognizing unit 14 determines whether the size of the third area resulting from joining of the first area 62d and the second area 62e is greater than or equal to a certain size estimated from the position in the real space corresponding to the third area. The size of the third area is defined by a horizontal width x3 and a vertical width y3.

If the determination is affirmative (YES in STEP55), in STEP57, the object recognizing unit 14 recognizes the third area as a candidate for the image portion of the Botts' dot. For example, when the size of the third area resulting from joining of the first area 62d and the second area 62e, which is calculated from the horizontal width x3 and the vertical width y3 illustrated in FIG. 4C, is greater than or equal to the certain size estimated from the position in the real space corresponding to the third area, the object recognizing unit 14 recognizes the third area as the image portion of the Botts' dot.

If the determination is negative (NO in STEP55), in STEP58, the object recognizing unit 14 recognizes that the first area is not a candidate for the image portion of the Botts' dot and is not a candidate for the image portion of the projection.

Upon completion of STEP 5 in FIG. 2A (STEP 51 to STEP 58 in FIG. 2A) for each first area, in STEP6 in FIG. 2B, the object recognizing unit 14 recognizes the recognized candidate for the Botts' dot as the Botts' dot. Here, it may be determined whether the candidate for the Botts' dot is the Botts' dot on the basis of another road environment.

Figure 5:
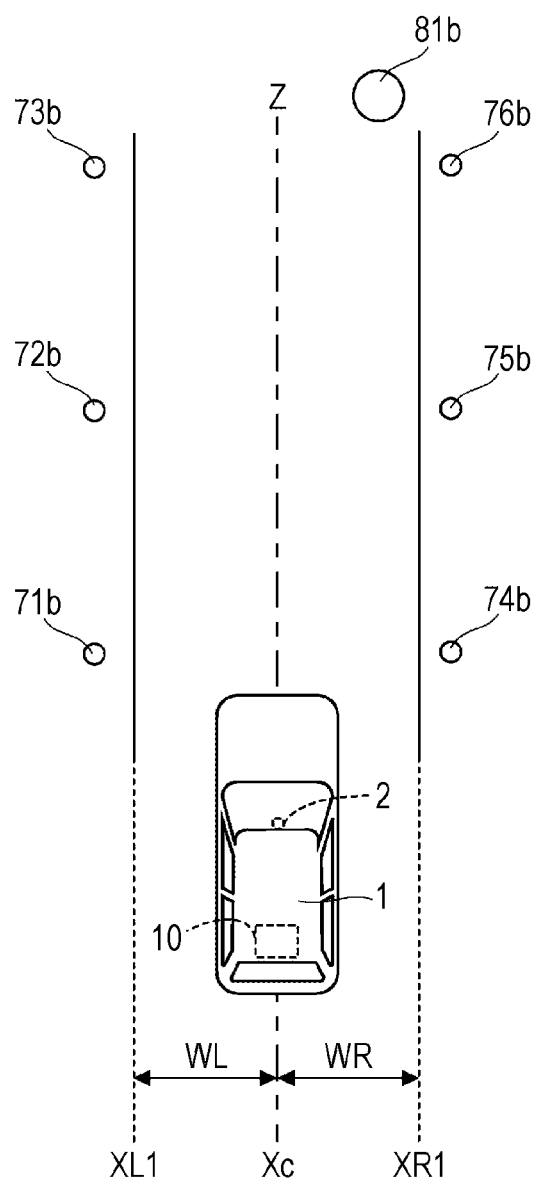
FIG. 5 is a diagram for describing how to recognizing a traffic lane on the basis of the Botts' dots.

FIG. 5 illustrates an example in which multiple Botts' dots are provided on both sides of the traffic lane on which the vehicle 1 is travelling.

In the example in FIG. 5, six Botts' dots candidates 71b to 76b are detected on both sizes of the traffic lane. These Botts' dots candidates 71b to 76b are recognized as the Botts' dots (hereinafter simply referred to as "Botts' dots 71b to 76b").

In STEP7, the object recognizing unit 14 recognizes the recognized candidate for the projection as the projection. Here, it may be determined which type is the projection on the basis of the detailed shape of the projection. The object recognizing unit 14 may determine whether the projection is an obstacle on the basis of the size of the projection.

In the example in FIG. 5, a projection candidate 81b is detected in front of and to the right side of the vehicle 1. The projection candidate 81b is recognized as the projection (hereinafter simply referred to as a "projection 81b").

In STEP8, the object recognizing unit 14 recognizes the middle position of the traffic lane on the basis of the positions of the left Botts' dots 71b to 73b and the right Botts' dots 74b to 76b. In the example in FIG. 5, the object recognizing unit 14 recognizes a middle position Xc between an inner position XL1 of the left-side Botts' dots 71b to 73b and an inner position XR1 of the right-side Botts' dots 74b to 76b.

In the example in FIG. 5, the middle position Xc between the inner position XL1 of the left-side Botts' dots 71b to 73b and the inner position XR1 of the right-side Botts' dots 74b to 76b is recognized as the middle position of the traffic lane.

In STEP9, the steering control unit 15 activates the steering mechanism 7 to assist the driving operation of the driver of the vehicle 1 so that the vehicle 1 travels near the middle position Xc within the traffic lane.

When the shift between the vehicle 1 and the middle position Xc is increased and a distance WR between the vehicle 1 and the right-side Botts' dots 74b to 76b or a distance WL between the vehicle 1 and the left-side Botts' dots 71b to 73b is smaller than or equal to a predetermined determination value, the steering control unit 15 activates the steering mechanism 7 to cause the vehicle 1 to be close to the middle position Xc.

In addition, the steering control unit 15 performs avoidance control to avoid a contact of the vehicle 1 with the recognized projection 81b. The steering control unit 15 may perform the avoidance control only when the projection 81b is recognized as an obstacle.

(Effects and Advantages of Road Environment Recognizing Apparatus)

With the road environment recognizing apparatus 10 having the above configuration, when the first areas 61d to 63d corresponding to the image portions of the places that are not shaded and second areas 61e to 63e corresponding to the image portions of the shaded places are extracted even if part of the projections is covered with the shades of the projections, the projections are recognized on the basis of the third areas resulting from joining of the first areas and the second areas. As a result, the probability of false recognition is reduced, in which it is estimated that the projections do not exist because part of the projections is covered with the shades despite the fact that the projections exist.

Accordingly, with the road environment recognizing apparatus 10 having the above configuration, it is possible to increase the accuracy in recognition of the projections in the recognition of the projections around the road.

With the road environment recognizing apparatus 10 having the above configuration, since the first areas 51d to 54 and 61d to 63d are extracted on the basis of the calculated edge direction, the extraction accuracy of the first areas having the luminances higher than or equal to a predetermined value is increased. As a result, it is possible to increase the accuracy in recognition of the projections in the recognition of the projections around the road in the road environment recognizing apparatus 10 having the above configuration.

With the road environment recognizing apparatus 10 having the above configuration, since the first areas 51d to 54 are recognized as the image portions of the projections when the sizes of the first areas 51d to 54 having a first color (white) is within a first range corresponding to the sizes of the projections, it is possible to recognize the projections with high accuracy.

In the road environment recognizing apparatus 10 having the above configuration, although the sizes of the first areas 61d to 63d corresponding to the portions irradiated with a light source, such as the sunlight, of the projections may be varied depending on the direction of the light source, the sizes of the third areas resulting from joining of the portions of the projections and the second areas 61e to 63e corresponding to the shaded portions of the projections depend on the sizes of the projections. Accordingly, it is estimated that the degree of change in the sizes of the third areas is small.

Consequently, when the sizes of the third areas are within a certain range defined by the sizes of the projections, the probability of the third areas being the image portions of the projections is high.

With the road environment recognizing apparatus 10 configured from this viewpoint, it is possible to increase the accuracy in recognition of the projections in the recognition of the projections around the road.

With the road environment recognizing apparatus 10 having the above configuration, it is possible to control the vehicle 1 on the basis of (the inner position XL1, the inner position XR1, and the middle position Xc of) the traffic lane using the road studs as the boundary on the road on which the road studs (the Botts' dots) are provided.

With the road environment recognizing apparatus 10 having the above configuration, since the vehicle 1 is controlled with the road studs distinguished from the projections on the road, which are different from the road studs, it is possible to control the vehicle 1 in accordance with the actual road environment.

With the road environment recognizing apparatus 10 having the above configuration, the avoidance control is performed when the projection is recognized as an obstacle while the avoidance control is not performed when the projection is not recognized as an obstacle. Accordingly, it is possible to stably control the vehicle 1, compared with a case in which the avoidance control is performed for all the projections.

With the road environment recognizing apparatus 10 having the above configuration, since the second areas 61e to 63e are searched for in the area around the first areas 61d to 63d, in which the shaded image portions of the projections estimated on the basis of the direction of the sunlight are likely to exist, it is possible to reduce the calculation cost.

(Modifications)

Although the Botts' dots and the projections are used as objects to be recognized in the above embodiments, the objects to be recognized are not limited to those. For example, cat's eyes or pylons may be used as the objects to be recognized.

What is claimed is:

1. A road environment recognizing apparatus comprising:
a camera that captures an image of a road environment along which the camera moves, the road environment containing a projecting object and surroundings thereof;
an edge image generator that generates an edge image of the projecting object by extracting edge points from the image of the road environment captured by the camera, the edge points defining a border across which a luminance intensity changes from a luminance intensity of the surroundings to be a luminance intensity higher than or equal to a predetermined value;
an area extractor that extracts a first area from the edge image, the first area being partitioned by the edge points and having a luminance intensity higher than the luminance intensity of the surroundings, the area extractor being capable of extracting a second area adjacent to the first area and having a luminance intensity lower than the luminance intensity of the surroundings; and
an object recognizer that is configured to recognize an area in which the projecting object is considered to exist, based on a third area formed of the first area and the second area, and to recognize the projecting object as a road stud if the third area has a predetermined size defined by an actual size of the road stud.

2. The road environment recognizing apparatus according to claim 1,
wherein the area extractor extracts the first area that is surrounded by the edge points.

3. The road environment recognizing apparatus according to claim 1,
wherein the object recognizer recognizes the first area as an image of the road stud if the first area has a hue corresponding to a first predetermined color and a size corresponding to or smaller than a first predetermined size, the first predetermined color being defined by a hue in an actual color of the road stud, the first predetermined size being defined by the actual size of the road stud.

4. The road environment recognizing apparatus according to claim 3,
wherein the object recognizer searches for the second area that is adjacent to the first area and that has a hue corresponding to a second predetermined color darker than the first predetermined color, if the size of the first area is smaller than the first predetermined size, and
wherein if the size of the first area is smaller than the first predetermined size, the object recognizer recognizes the third area as the image of the road stud if the third area corresponds to or smaller than a second predetermined size defined by the size of the road stud.

5. The road environment recognizing apparatus according to claim 1,
wherein the object recognizer recognizes the area of the projecting object as an area of a road stud if the area of the projecting object is considered to be the area of the road stud, the road environment recognizing apparatus further comprising:
a traffic lane recognizer configured to recognize a traffic lane on the basis of the recognized road stud; and
a steering controller configured to perform steering control of a vehicle on the basis of the recognized traffic lane.

6. The road environment recognizing apparatus according to claim 5,
wherein the object recognizer is configured to distinguish the projecting object that is recognized as the road stud from the projecting object that is not recognized as the road stud on the road, and
wherein the steering controller performs the steering control in a different manner based on said recognition by the object recognizer.

7. The road environment recognizing apparatus according to claim 6,
wherein the object recognizer is configured to determine whether the recognized projecting object is an obstacle on the basis of a height of the recognized projecting object, and
wherein the steering controller performs the steering control to avoid the recognized projecting object when the projecting object is recognized as the obstacle and performs the steering control not to avoid the recognized projecting object when the projecting object is not recognized as the obstacle.

8. The road environment recognizing apparatus according to claim 1,
wherein the object recognizer searches for the second area from an area surrounding the first area, on the basis of a direction of sunlight.

9. A vehicle comprising:
a camera that captures an image of a road environment along which the vehicle moves, the road environment containing a projecting object and surroundings thereof;
an edge image generator that generates an edge image of the projecting object by extracting edge points from the image of the road environment captured by the camera, the edge points defining a border across which a luminance intensity changes from a luminance intensity of the surroundings to be a luminance intensity higher than or equal to a predetermined value;
an area extractor that extracts a first area from the edge image, the first area being partitioned by the edge points and having a luminance intensity higher than the luminance intensity of the surroundings, the area extractor being capable of extracting a second area adjacent to the first area and having a luminance intensity lower than the luminance intensity of the surroundings; and
an object recognizer that is configured to recognize an area in which the projecting object is considered to exist, based on a third area formed of the first area and the second area, and to recognize the projecting object as a road stud if the third area has a predetermined size defined by an actual size of the road stud.

10. A method for recognizing a projecting object in a road environment:
by a camera that captures an image of a road environment along which the camera moves, capturing an image of a road environment which contains a projecting object and surroundings thereof;
by an edge image generator, generating an edge image of the projecting object by extracting edge points from the captured image of the road environment, the edge points defining a border across which a luminance intensity changes from a luminance intensity of the surroundings to be a luminance intensity higher than or equal to a predetermined value;
by an area extractor, extracting a first area from the edge image, the first area being partitioned by the edge points and having a luminance intensity higher than the luminance intensity of the surroundings;

by an object recognizer, searching a second area adjacent to the first area and having a luminance intensity lower than the luminance intensity of the surroundings; and by the object recognizer, recognizing an area in which the projecting object is considered to exist based on a third area formed of the first area and the second area, the projecting object being recognized as a road stud if the third area has a predetermined size defined by an actual size of the road stud.

* * * * *